United States Patent [19]

Spinner et al.

[11] Patent Number: 4,872,240
[45] Date of Patent: Oct. 10, 1989

[54] STEEL KNOT FOR ROPES

[75] Inventors: Raphael F. Spinner, Hillsboro, Ill.; Clement F. Marley, R.R. 2 Box 165, Nokomis, Ill. 62075; Mary Brown, executrix of said Raphael F. Spinner, deceased; Cathy Grant, executrix of said Raphael F. Spinner, deceased

[73] Assignee: Clement F. Marley, Noromis, Ill.

[21] Appl. No.: 113,468

[22] Filed: Oct. 26, 1987

[51] Int. Cl.$^4$ .............................................. F15G 11/00
[52] U.S. Cl. ............................... 16/114 B; 24/115 G; 24/115 K; 24/129 R
[58] Field of Search .......................... 16/114 B; 43/87; 24/115 G, 115 H, 115 K, 129 R; 294/82.14, 74

[56] References Cited

U.S. PATENT DOCUMENTS

| | | | |
|---|---|---|---|
| 535,680 | 3/1805 | Davis | 24/115 G |
| 749,847 | 1/1904 | Curtis | 43/87 |
| 1,053,593 | 2/1913 | Gould | 24/115 G |
| 1,718,641 | 6/1929 | Forman | 24/129 R |
| 1,828,350 | 10/1931 | Williams | 24/115 K |
| 3,094,755 | 6/1963 | Casanave | 24/129 R |
| 4,414,712 | 11/1983 | Beggins | 24/129 R |

Primary Examiner—Nicholas P. Godici
Assistant Examiner—Edward A. Brown

[57] ABSTRACT

The steel knot for ropes is a device to replace the time-honored metal hook and conventional knots used on tow and hoist ropes, and also tethering ropes. The device comprises two appropriately spaced rounded metal rings held together in proper relation to each other by 2 or more metal bars or similar connectors. To use the device, a rope is inserted through the rings and is then wrapped around the intended load. The end of the rope is then tucked between the device and a pushed-out portion of the rope. Next, either an overhand knot is tied in the end of the rope, or the rope end is wrapped around the device once again, and again tucked in between the pushed-out portion and the steel device. Tension on the rope secures the device in place. When pressure is relaxed the rope is easily untied. Should the rope break under stress, it will pull out of the steel piece immediately, thus permitting the steel device to drop free of the rope. Metal will not be thrown in the opposite direction by the elasticity of the rope as would occur if part of the hook remains attached to the rope. When it is desired to use a rope without a steel knot, the steel device is slid off the rope.

1 Claim, 2 Drawing Sheets

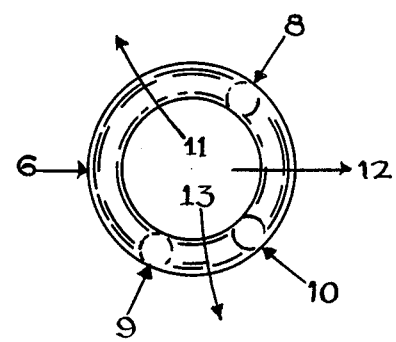
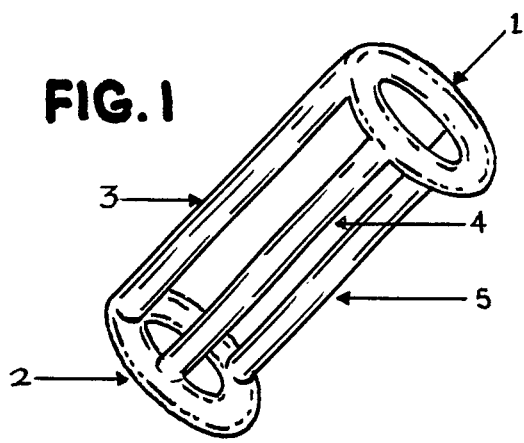
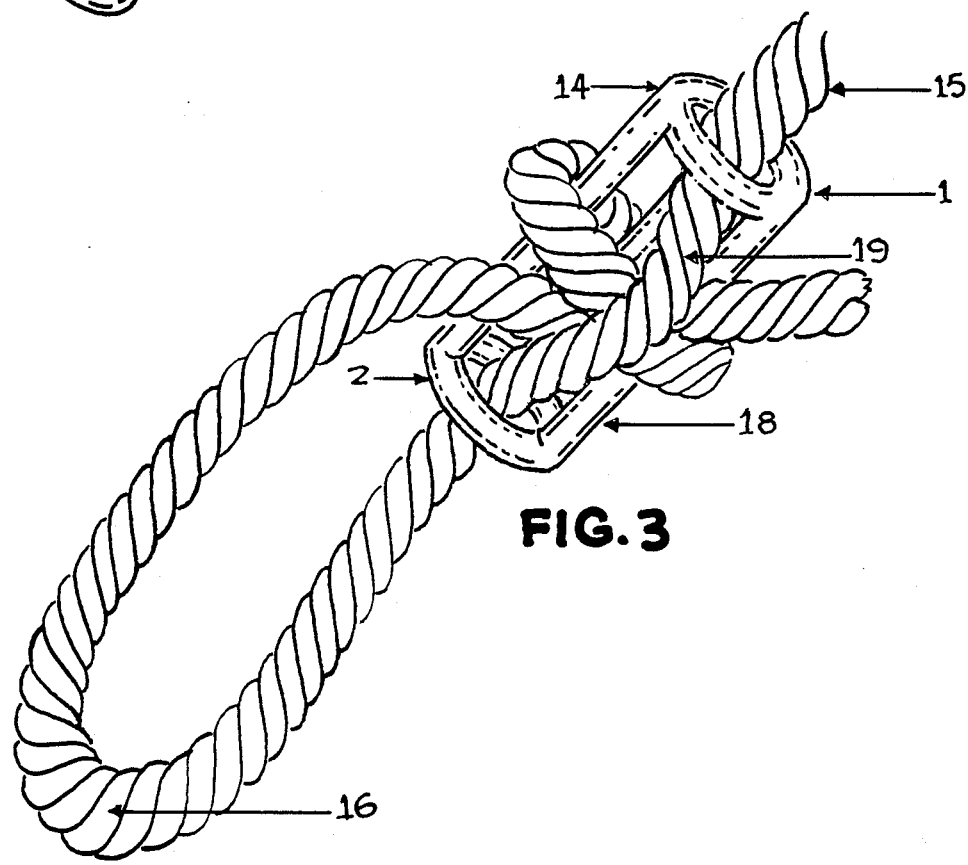

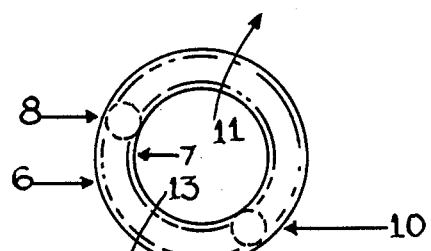
FIG.5
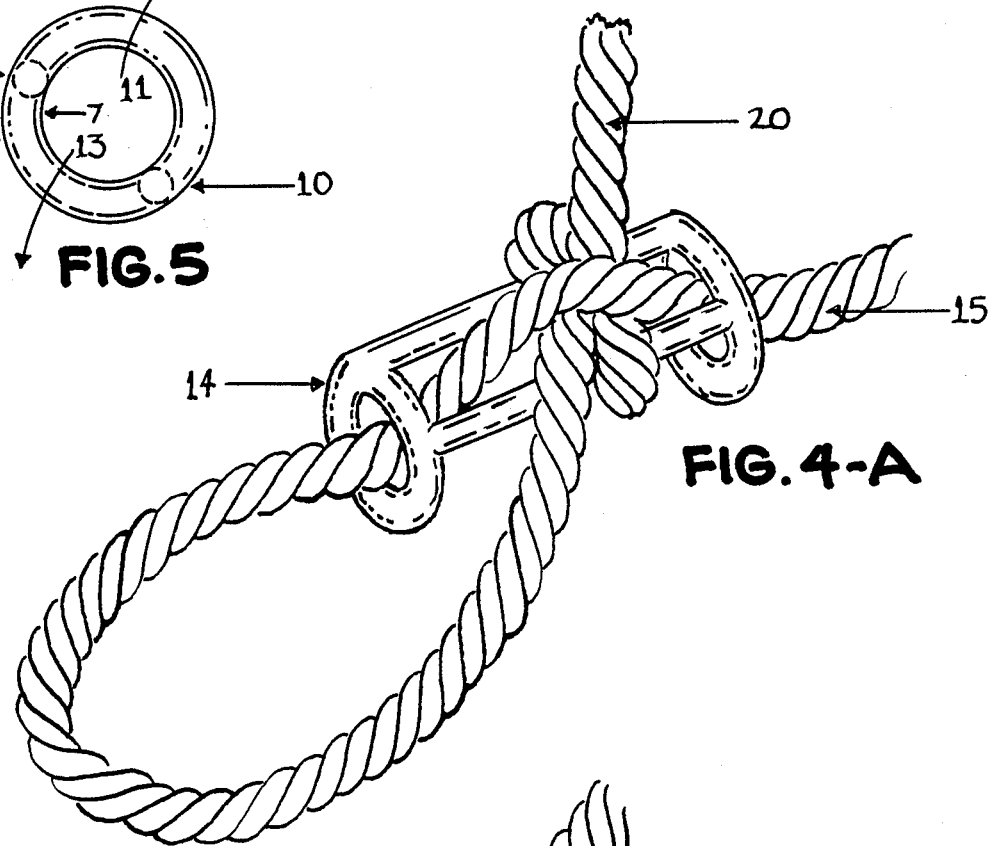
FIG.4-A
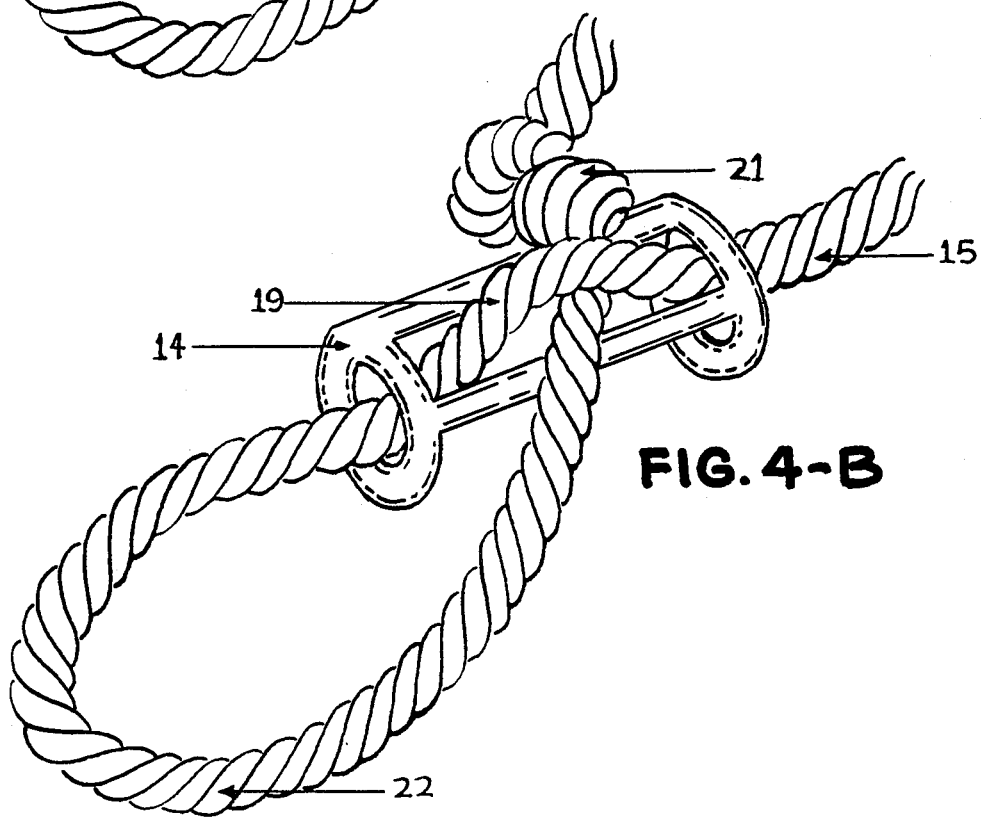
FIG.4-B

STEEL KNOT FOR ROPES

BACKGROUND OF THE INVENTION

This invention relates generally to a device to replace the time-honored common hook, the spliced-end loop, and the conventional knots used on tow ropes and hoist ropes of all kinds used for towing and lifting loads of all kinds.

The common open hook long has had several drawbacks and has caused certain inconveniences and annoyances. Now with the advent of newer ropes with more elasticity, the stress on ropes can be increased immensely resulting in even more danger of breaking hooks. Those broken hooks have resulted in high speed backlash which sends ropes with broken hooks in the opposite direction in a highly dangerous fashion, many times in the death or serious injury to persons, and also to property damage.

Furthermore, the common hook also has been the cause of inconvenience and annoyance because it easily unhooks itself with alternating tensioning and slackening of load pressures.

Also, conventional knots in stretchable rope tend to get impossibly tight when under pressure because the rope narrows in diameter. Ropes tied with this kind of pressure cannot be untied and must be cut.

Still another advantage of the steel knot is that it can be slid off the rope easily when the rope is used without a hook. Reattaching the steel knot is just a matter of rethreading it.

The steel knot is neither a conventional knot nor a hook, but it replaces both. The steel knot has advantages over the conventional rope in other ways. While the term "steel knot" is used because most adaptations will be of steel, it is not required that this invention be manufactured of steel. In some instances plastics will serve well.

Earlier inventors have designed metal or otherwise rigid fasteners for rope, string, wire, and cord but no known fastener performs all the necessary functions of the present invention.

D. Gould (U.S. Pat. No. 1,053,593) discloses a cord adjuster for electrical cord. However, the Gould device would function poorly as a steel knot because it features half loops and not rings on the ends. Also the three bars are not parallel to each other and they are approximately evenly spaced which would inhibit use of ropes of differing diameters. Furthermore, under extreme pressure Gould's device would tend to compress when absolute rigidity is necessary.

A. E. Davis (U.S. Pat. No. 535,680) discloses a shoe lace tie fastener. It consists of a hollow member which is split lengthwise through its walls at 180 degrees to each other. The sides of the member are expanded to allow passage of a shoe lace. A larger version of the Davis device would not work well as a steel knot because it would have sharp "V" edges at the ends of the slits which would create cutting edges and would damage rope. Also, one method of tying rope with a steel knot requires an overhand knot on the end. This kind of knot would be pulled into the "V" slits of the Davis invention and would be damaged.

H. E. Forman (U.S. Pat. No. 1,718,641) discloses a metal fastener for rope which consists of two half-loops and two bar connectors held to the rope with a cotter pin. Forman's fastener will lend itself to one kind of knot, but would not work well when tied as indicated by FIG. 3 of the present invention. The open clamps of the Forman device either would bend under pressure, or else the device would have to be constructed of unnecessarily heavy materials to work with present-day nylon ropes. Also, the cotter pin would damage the rope.

J. C. Casanave (U.S. Pat. No. 3,094,755) discloses a rope and connector assembly which is compressed of two parallel metal barrels welded together. The Casanave device varies from the steel knot in several ways. This device requires an overhand knot permanently tied in the end of the rope. The device requires a tethering post. It is limited in the size of rope it will accept. It cannot be tied as indicated by FIG. 3 of the present invention. It cannot be removed from the rope without cutting the knot when the assembly is not to be used.

Paul T. Beggins (U.S. Pat. No. 4,414,712) discloses a double barrel line fastening device. This device threads the rope in such a way as to force it into outward bends for retention. Such bends work well for tethering but would not work as well when the goal is safety as in tow ropes. They would not snap free as readily as would the present invention. The Begins device is also limited as to the sizes of ropes the device would accommodate.

SUMMARY OF THE INVENTION

There are several objects to the invention. The most important object is a design that will let the rope disconnect itself from the steel knot when the load is so heavy that the rope breaks. When the rope breaks, the steel knot drops harmlessly to the ground.

Another object of the invention is to provide a securing means that does not overtighten when under load. Overtightening makes unhitching from the load difficult and it may require cutting of the rope.

Another object of the invention is to maintain some constant grasping or connecting action when the tension in the rope is reduced. This allows the rope to remain attached to the load at all times.

Still another object of the invention is to provide the owner with the convenience of a steel knot that can be readily removed when it is not required to be used. In these cases, the steel knot is simply slid off of the rope.

BRIEF DESCRIPTION OF THE DRAWINGS

FIG. 1 is a three-quarter view of one embodiment of the steel knot with two rings and three unevenly spaced bars.

FIG. 2 is an end view of the steel knot of FIG. 1.

FIG. 3 illustrates how a rope is slipped into the steel knot and how a portion of the rope is pressed outward from the steel knot and to form a noose. The rope is then double threaded around the steel knot and held there when pressure is applied or even when the rope is slack.

FIG. 4 shows a rope threaded through a double bar steel knot and also a alternative method of tying the rope. This method does not use the wrap around but rather an overhand knot in the end of the rope to secure itself.

FIG. 5 is an end view of an embodiment of the steel knot having two uneven bars positioned as at the dotted lines.

DESCRIPTION OF PREFERRED EMBODIMENT

Referring now to the drawings, there is illustrated at FIG. 1 a one-piece steel member consisting of rings 1 and 2 separated by bars 3,4, and 5.

Rings and bars will vary in size and spacing in accordance with the diameter of the ropes to be used.

Seen in FIG. 2, is an end view of the steel knot. The larger circle 6 and the smaller circle 7 represent the exterior and interior surfaces, respectively, of a ring at one end of the steel knot. Smaller dotted circles 8, 9, and 10 indicate one arrangement of the bars of the steel knot, but many other configurations are possible. Thus, one steel knot with bars 8, 9, and 10 at varying locations can be used for ropes of varying diameters. Rope of larger diameter can be pushed out as at 11. Rope of lesser diameter can be pushed out at 12. Rope of yet smaller diameter can be pushed out at 13.

In accordance with the invention FIG. 3 illustrates a three bar steel knot 14 threaded with rope 15. Rope 15 extends through the full length of the steel knot 14 and is then formed into a loop 16. A portion of the rope 15 is pushed out from the end rings 1 and 2 and between bars 17 and 18 to form loop 19. The leading end of rope 15 then is inserted under rope loop 19 and makes a full circle around the steel knot 14 and is inserted under loop 19.

As is illustrated in FIG. 4, there are varying methods of securing a rope in the steel knot. Steel knot 14 is used with the rope with a plain end 20. Steel knot 14 can also be put onto rope 15 or taken off the rope without any difficulty. In another variation, steel knot 14 is used with rope with a knotted end 21. Rope 15 extends through the steel knot 14 and is formed into a hitching loop 22. Knotted end 21 extends between steel knot 14 and a small portion of rope 19. Pressure on rope 15 tightens portion 23 against steel knot 14 and end knot 21, and secures the hitch.

A variation of the steel knot with two uneven bars is illustrated in FIG. 5. The uneven bars are shown in positions 8 and 10 by dotted circles in this end view of the steel knot. Uneven spacings of bars permit the steel knot to be used with ropes of the varying diameters.

What is claimed is:

1. A device for tying a rope or a cable to a load comprising; two round end rings of equal diameter and two or more rounded and unevenly spaced parallel bars of equal length, one end of each bar is connected to the first ring and the other end of each bar is connected to the second ring, the rings are approximately parallel to each other, the lengths of said bars being equal and from three to six times the diameter of said rings.

* * * * *